(12) United States Patent
Anderson et al.

(10) Patent No.: US 7,891,678 B2
(45) Date of Patent: Feb. 22, 2011

(54) WAGON WITH REMOVAL BINS

(75) Inventors: Torrence Anderson, Overland Park, KS (US); Robert Kopp, Wheaton, IL (US)

(73) Assignee: Suncast Technologies, LLC, Palm Beach Gardens, FL (US)

( * ) Notice: Subject to any disclaimer, the term of this patent is extended or adjusted under 35 U.S.C. 154(b) by 179 days.

(21) Appl. No.: 12/050,724

(22) Filed: Mar. 18, 2008

(65) Prior Publication Data

US 2009/0236810 A1    Sep. 24, 2009

(51) Int. Cl.
*B62B 3/00* (2006.01)
(52) U.S. Cl. .................. 280/47.35; 280/47.4; 280/30
(58) Field of Classification Search ............ 280/47.35, 280/47.4, 47.371, 47.34, 47.41, 655.1, 79.11, 280/79.2, 87.01, 30; 312/154, 235.2, 249.11
See application file for complete search history.

(56) References Cited

U.S. PATENT DOCUMENTS

| | | | |
|---|---|---|---|
| 5,100,198 A * | 3/1992 | Baltzell | 312/235.2 |
| 5,207,723 A * | 5/1993 | Newby, Sr. | 312/249.11 |
| 5,529,323 A | 6/1996 | vom Braucke et al. | |
| 5,538,267 A | 7/1996 | Pasin et al. | |
| 5,615,903 A | 4/1997 | Spear et al. | |
| 5,660,296 A | 8/1997 | Greenwich | |
| 5,687,979 A | 11/1997 | Plevka | |
| 5,692,761 A | 12/1997 | Havlovitz | |
| 5,876,047 A * | 3/1999 | Dennis | 280/47.35 |
| 5,876,049 A | 3/1999 | Spear et al. | |
| 6,079,720 A | 6/2000 | Spear et al. | |
| 6,193,247 B1 | 2/2001 | Spear et al. | |
| 6,318,740 B1 * | 11/2001 | Nappo | 280/87.01 |
| 6,497,424 B2 * | 12/2002 | Gartner et al. | 280/47.4 |
| 7,517,028 B2 * | 4/2009 | Hand | 312/184 |

* cited by examiner

*Primary Examiner*—Hau V Phan
(74) *Attorney, Agent, or Firm*—McHale & Slavin, P.A.

(57) ABSTRACT

A wagon assembly for carrying items and materials typically used in lawn and garden care. The wagon assembly has a wheeled unitary body construction that forms a storage compartment. A storage bin can be placed inside the compartment or beneath and external the storage compartment. A lid is positionable over the storage compartment having recesses formed within the lid for holding of various items including a cushion, the recesses each having a drain to avoid the collection of water. A handle is provided by use of a flexible and detachable pull strap. The strap is adjustable in length and allows pulling of the wagon at most as well as hands free operation when desired.

26 Claims, 4 Drawing Sheets

WAGON WITH REMOVAL BINS

FIELD OF THE INVENTION

This invention relates to wagons for use in the lawn and garden area, and, more particularly to an improved wagon having removal bins.

BACKGROUND OF THE INVENTION

Yard and garden chores typically involve moving items from one area of the yard to another or simply require storage. For instance, if an individual wanted to do gardening, the individual may take various utensils such as limb pruners, weed removing devices, fertilizer, insect treatment, and so forth. An individual may systematically carry each item or more compactly carry such items in a small utility wagon. There are numerous types of wagons on the market, each having enlarged wheels, an area for carrying multiple items, and typically a seat formed along the top of the wagon where the individual can use the wagon as a portable seat or perform in the various yard and/or garden functions.

U.S. Pat. No. 6,193,247 discloses a portable stackable wagon assembly having a main compartment with a removable tray. The stackable wagon has a lid that doubles as a handle, the lid being a rigid structure that inhibits pulling of the wagon in a closed position. For instance, if the wagon was used to transfer leaves, dirt, fertilizer, and the like and open top would be allow the wind to disturb the contents.

U.S. Pat. No. 5,876,049 discloses a wagon assembly having a main compartment to accommodate the carriage of items and materials used in gardening and lawn care. A rigid handle structure is connected to one end of the wagon body and has a pair of generally opposed surfaces that can be moved between a seating position wherein the handle structure extends waywardly with respect to the wagon body structure and a range of operating positions wherein the handle structure extends forwardly with respect to the wagon body structure.

U.S. Pat. No. 6,079,720 discloses a wagon assembly for use in gardening and lawn care having a wagon body structure with a rigid handle structure pivotally connected to the forward end of the wagon body such at the handle structure moves between a stacking position and an open position for pulling purposes.

U.S. Pat. No. 5,538,267 discloses a convertible wagon that includes a handle that can pivotally attached to a latch on the front of the wagon so that it may be pulled or it can be snapped in an upright position and to a locking assembly on the back wall of the wagon so that it can be pushed. The wagon includes a removable panel that separates passenger and storage compartments within the wagon body.

U.S. Pat. No. 5,529,323 discloses a wagon assembly having a horizontal bed with wheels attached to sleeves extending downwardly from a frame. Upper ends of the sleeves are hollow to receive mounting posts affixed to removal sidewalls. The sleeves extend upwardly no higher than the bed of the wagon so that access to the bed is not obstructed. A manual pull rod is attached to the wagon and includes a generally arrow shaped pull handle designed to allow the user to pull the wagon.

U.S. Pat. No. 5,687,979 discloses wheel barrel attachments for releaseably supporting tools having rod like handles and for storing small hand tools. One attachment comprises at least one generally L-shaped bracket having first and second legs. The first leg of each bracket is configured to be mounted on the wheel barrel frame beneath a tray, and the second leg is configured to extend upwardly along one side of the wheel barrel tray. A gripping clip for releasably supporting a rod like handle of a tool secured to the second leg of each generally L-shaped bracket. Another attachment comprises a box like enclosure mounted below the tray of the wheel barrel and having an opening in the end thereof facing the rearward end of the wheel barrel, for receiving small hand tools therein.

U.S. Pat. No. 5,660,296 discloses a mobile cooler having a container that is petitioned to form a cold compartment and a non-cooled compartment. A cover is mounted over the container to allow both compartments and further function as a small chair.

U.S. Pat. No. 5,692,761 discloses a utility cart having two pairs of wheels allowing the cart to be tilted in both directions on respective wheels by means of a collapsible loop handle with an angled cross bar. The utility carts may be stacked or nested within one another, with either the handle extended or collapsed.

U.S. Pat. No. 5,615,903 discloses a utility cart having a tool handle holding the device firmly holding lawn and garden devices to the side of the utility cart. The device consists of one or more clips that are disposed below the rim of a bin of the utility cart and may be integrally molded from a suitable plastic material. Each clip is deformable within an elastic limit so that a tool handle may be inserted forced into the clip wherein it is held with the clip, upon elastic contraction of the clip, by a tool retaining flange and a tool retain lip. Removal of the tool handle from the clip is effected by removably forcing the handle out of the clip whereupon the clip deforms sufficiently to allow the tool handle to pass between the tool retaining flange and the tool retaining lip.

What is lacking in the art is a multi-purpose wagon having a storage bin that can be placed outside the wagon and includes a strap handle to flexibility for pulling of the wagon in a variety of positions including hands free.

SUMMARY OF THE INVENTION

Disclosed is a wagon assembly for carrying items and materials typically used in lawn and garden care. The wagon assembly consists of a unitary body construction that forms a storage compartment supported by wheels. The wheels are oversized and allow the wagon assembly to be rolled over most any surface for ease of transporting the lawn and garden care materials over rough terrain. The wagon assembly includes a storage bin that can be placed inside the compartment or beneath the compartment external to the normal carrying area. In addition to carrying additional items outside the main storage compartment, the storage bin permits the access to other tools when the main storage compartment is used for carrying bulk materials, such as dirt or fertilizer. A lid is positionable over the storage compartment and includes structural reinforcement ribs to rigidity to the lid with minimal plastic reinforcement. Additionally, a cushion can be placed on the lid for comfort while sitting. The cushion is adapted to fit within of the recesses formed within the lid. Each recess can be used for holding items such as drinks, tools, and the like with each recess having a drain to avoid the collection of water. A handle is formed from a flexible pull strap that allows pulling of the wagon. The strap is detachable, adjustable in length, and allows pulling of the wagon at almost any angle for hands free pulling if desired.

An objective of the instant invention is to disclose a wagon assembly for lawn an garden use that employs a strap for use as a handle, the strap allowing the wagon to be pulled at most any angle and provides adjustability in length as well as detachment of the handle so the wagon can operate in close quarters without an interfering rigid handle.

Yet another objective of the instant invention is to disclose a wagon assembly having a removable storage bin placed external to a main compartment. The removable storage bin being placed beneath the compartment between the wheels of the wagon.

Yet another objective of the instant invention is to disclose a wagon assembly having a storage bin that may be placed internal or externally the main storage compartment providing flexibility in bin placement.

Still another objective of the instant invention is to disclose a lid overlying the main storage compartment having recesses available for placement of various items, including a cushion seat, and a drain gutter to prevent the collection of water within each recess.

Yet another objective of the invention is to provide a lid having strategically placed recesses that allow stackability of similar shaped wagons wherein the wheels of a stacked wagon fit within the recesses of a base wagon for ease in storage and shipping.

Yet another objective of the instant invention is to provide a compact wagon assembly for storage of items used in lawn and garden care that can operate as a comfortable seating area while maintaining access to at least one attached storage compartment.

Still another objective of the instant invention is to use enlarged wheels, approximately 7 inches in diameter, that allow movement of the wagon assembly over uneven surfaces found with lawn and garden terrains.

Yet still another objective of the instant invention is to disclose a wagon assembly having a removable lid allowing the transferring of materials extending above the normal level of the storage compartment, and provide the ability to pull the wagon by a flexible strap.

Yet still another objective of the instant invention is to provide a pulling strap that allows universal attachment to most any pulling device, including a lawn tractor.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE PREFERRED EMBODIMENT

Figure 1:
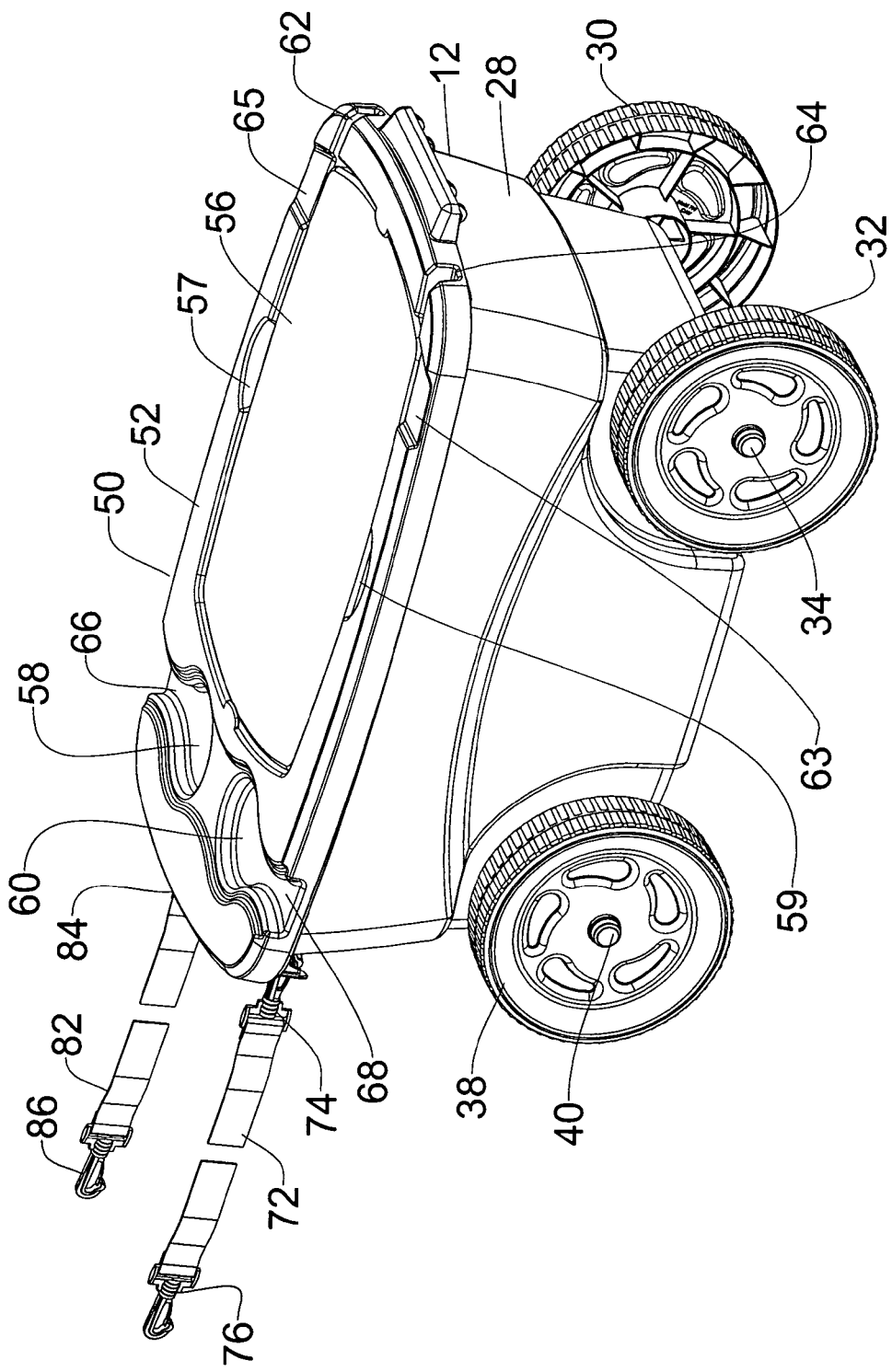
FIG. 1 is a perspective view of the wagon assembly of the instant invention.
Figure 2:
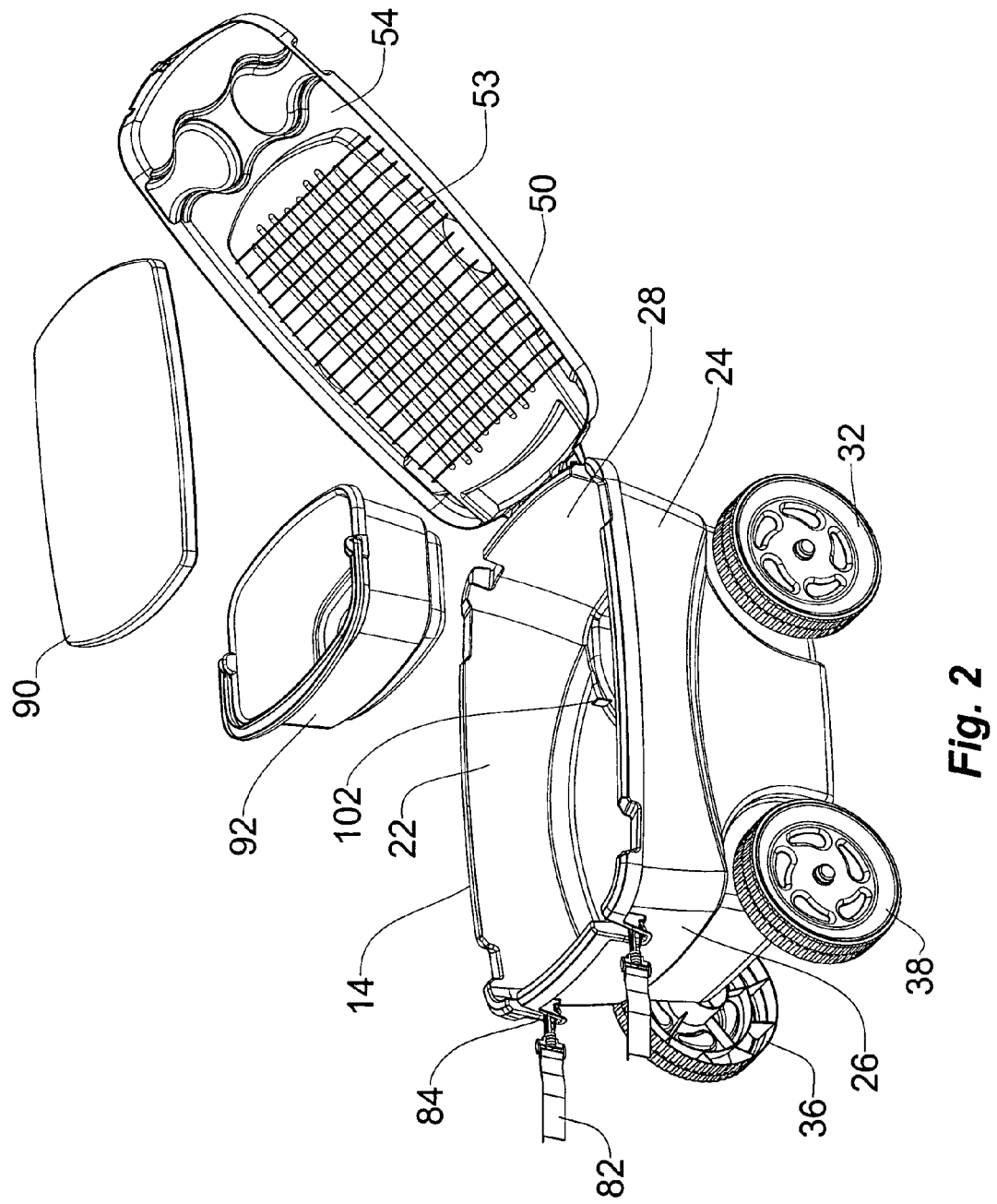
FIG. 2 is an exploded view of the wagon assembly.

Although the invention will be described in terms of a specific embodiment, it will be readily apparent to those skilled in this art that various modifications, rearrangements and substitutions can be made without departing from the spirit of the invention. The scope of the invention is defined by the claims appended hereto.

Now referring to the Figures in general, depicted is the wagon assembly 10 of the instant invention which having a general use for carrying items and materials typically used in lawn and garden care. The wagon assembly allows the user to include items within a main storage compartment, a first removable storage bin sized for fitting within the main storage compartment, or an second removable storage bin that couples to the bottom of the wagon.

In particular, the wagon assembly 10 has a unitary body portion 12 which forms a main storage compartment 14 for use in placing of the lawn and garden care items. The unitary body portion is formed from plastic and has a generally rectangular bottom wall 16 having an upper surface 18 and a lower surface 20. From the bottom wall 16 the main storage compartment is further formed by sidewalls 22 and 24 and endwalls 26 and 28. The sidewalls and endwalls extend upwardly from the bottom wall.

The wagon assembly is supported by wheel structures. The wheel structures consist of a pair of front wheels 30 and 32 supported by an axle 34 and are positioned along a lower edge of the first endwall 28. Similarly, a pair of wheels 36 and 38 have a common axle 40 and is juxtapositioned along a lower edge of second endwall 26. The wheels are oversized, preferably having a diameter of approximately 7 inches, which allows the maneuverability of the wagon over most any terrain found in lawn and garden environments.

The sidewalls 22 and 24 each include a fender curvature so as to allow inboard positioning of the wheels; such positioning maintains a narrow profile wherein the wheels do not extend outside the lip of the main storage compartment.

The wagon assembly includes a lid structure 50 constructed and arranged to enclose the main storage compartment 14. The lid has an upper surface 52 with recesses and a lower surface 54 with reinforcement ribs 53. the reinforcement ribs create rigidity to the lid without excess plastic usage. The recesses in the upper surface include a seat recess 56 and cup recesses 58 and 60. The recesses can be used for most any purpose, such as creating a work top table or for holding of tools wherein the recesses help prevent items from falling off the lid should it be used as a work table. The recesses include rain gutters to prevent the collection of water within the recess. Recess 56 incorporates rain gutter 62 and 64. Similarly, cup holder 58 has a open edge 66 that allows the drainage of water through the formation of a gutter and cup holder 60 includes drainage area 68.

The drainage areas 62 and 66 and recess area 63 and 65 further form wheel positioning areas. In this embodiment, the wagon assembly can be stacked wherein the lid of one assembly becomes the wheel positioning base of a similar shaped wagon. The stacking permits ease of storage, shipping and minimizes floor space necessary for display purposes.

The wagon assembly can be moved by the use of a pull strap 70 in combination with the wheel structure. The pull strap consists of a first strap 72 having buckle latch 74 & 76 located at each end of the strap. The strap is flexible and the distance between the buckle latches may be adjusted. A second strap 82 further includes a snap buckle 84 and 86 also of adjustable length. The use of the split pull strap 70 allows a variety of pulling methods, including snapping of buckle latches 76 and 86 together wherein a loop is formed for placement around the hitch of a tractor, the seat back of a tractor, the waist of an individual, or simply forming a loop for pulling. To further illustrate the various pulling methods, the buckles 76 and 86 may be attached to the belt or belt loops of an individual allowing the wagon to be dragged in a hands free position. By eliminating a rigid handle, when the pull strap is not in use it can be moved out of the way and allow positioning of the wagon directly against a fixed structure. Further, the pull strap 70 may be detached from the unitary body portion wherein the wagon may serve solely as a storage vehicle. As the pull strap 70 is flexible, the pulling of the strap permits movement of the wagon along an infinite range of horizontal and angular positions.

A cushion 90 may be placed on the lid 50 and within the recess 56 for positioning. The recess includes a curved handle entry 57 & 59 allowing each of cushion removal. The storage compartment 14 may include an auxiliary removable storage bin 92 that is constructed and ranged to fit within the storage compartment for segregating of items therein.

Figure 3:
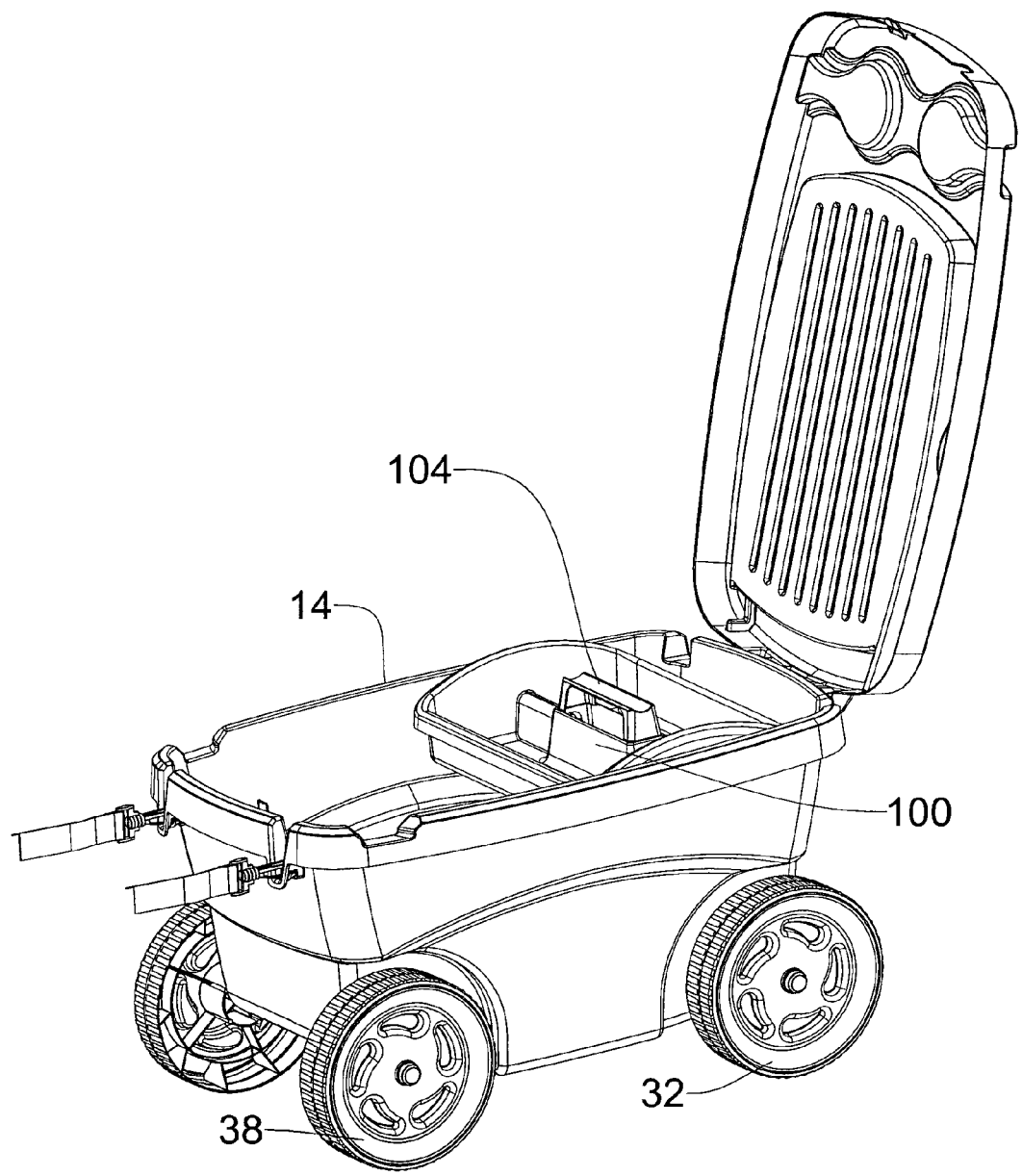
FIG. 3 is a perspective view of the wagon assembly depicting a storage bin placed in a main storage compartment.
Figure 4:
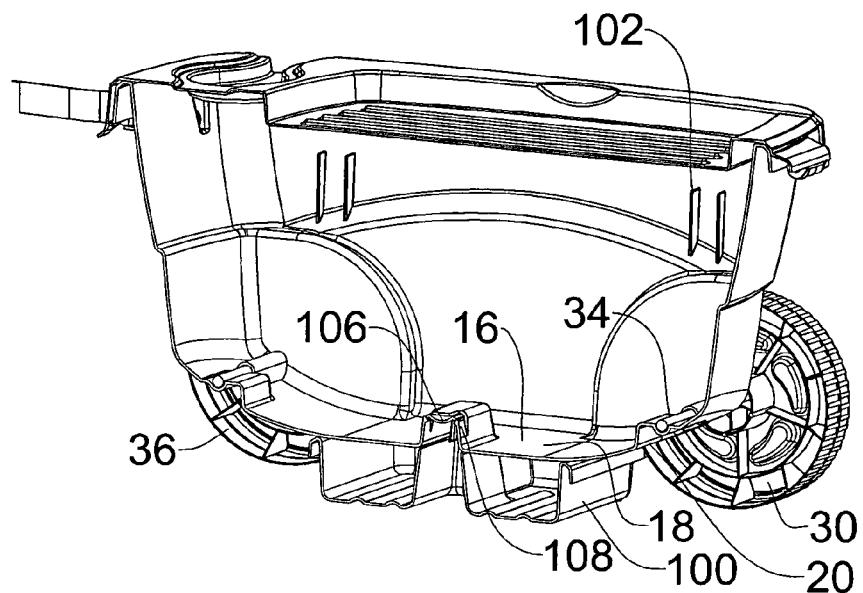
FIG. 4 is a cross sectional side view of the wagon assembly illustrating the storage bin placed external the main storage compartment.
Figure 5:
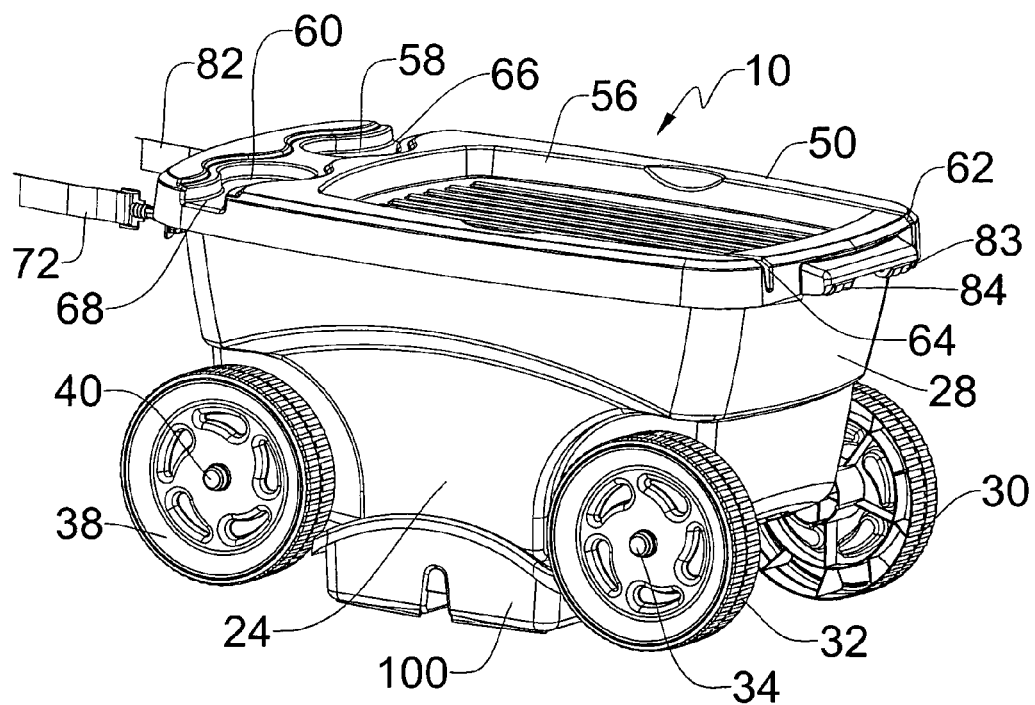
FIG. 5 is a side view of the wagon assembly with an installed external storage bin.

An internal/external storage bin 100 is shown placed within the main storage compartment of the unitary body 14 as shown in FIG. 3. The storage bin 100 can be placed on ledge tabs 102 for positioning of the storage bin within the compartment for stability. The storage bin 100 may be further positioned to a lower surface 20 of the bottom 16 of the unitary body portion as shown in FIG. 4. When placed external the main storage compartment, the storage bin 100 is positioned between the wheels. The handle 104 of the storage bin 100 includes a curvature 106 for engagement into the bottom surface which includes a snap lock 108. The snap lock allows for fastenerless securement of the storage bin wherein removal is caused by pulling of the storage bin 100 downward so as to disengage the handle from the snap lock.

The lid 50 is pivotally coupled to the unitary body 14 by use of hinges 81 and 83. The hinges allow the lid to be removed so as to allow the wagon to be used as an open cart wherein bulk materials may otherwise inhibit closure of the lid.

It is to be understood that while we have illustrated and described certain forms of our invention, it is not to be limited to the specific forms or arrangement of parts herein described and shown. It will be apparent to those skilled in the art that various changes may be made without departing from the scope of the invention and the invention is not to be considered limited to what is shown in the drawings and described in the specification.

The invention claimed is:

1. A wagon assembly for carrying items and materials used in lawn and garden care comprising:
   a unitary body portion forming a storage compartment from a generally rectangular bottom wall having an upper surface and a lower surface with sidewalls and endwalls extending upwardly therefrom;
   wheel structures rotatably connected to said unitary body portion of said first storage structure, said wheel structures spaced apart and juxtapositioned along a lower edge of said endwalls and being constructed and arranged to support said wagon assembly;
   a storage bin releasably secured to said lower surface of said bottom wall and positioned between said wheel structures; and
   a lid structure constructed and arranged to enclose said storage compartment, said lid hingedly secured to said first compartment at an upper edge of one of said endwalls.

2. The wagon assembly according to claim 1 wherein said storage bin is constructed and arranged to fit within said storage compartment.

3. The wagon assembly according to claim 2 wherein said storage compartment includes ledge tabs for positioning of storage bin within said compartment.

4. The wagon assembly according to claim 1 including a pull strap secured to said storage structure, said pull strap operating as a handle for use in pulling of the wagon assembly.

5. The wagon assembly according to claim 4 wherein said pull strap is constructed from a flexible strap wherein pulling on the strap permits movement of the wagon along an infinite range of horizontal angular positions.

6. The wagon assembly according to claim 4 wherein said pull strap is flexible and adjustable in length.

7. The wagon assembly according to claim 4 wherein said pull strap is removably secured to the wagon assembly.

8. The wagon assembly according to claim 1 wherein said wheel structures is further defined as a forward and aft wheel assembly, said forward and aft wheel assembly each having common axle extending across a width of said compartment with an wheels secured to each end of the axle.

9. The wagon assembly according to claim 8 wherein each said wheel is approximately 7 inches in diameter and each said sidewall is constructed and arranged to accommodate said wheel to permit.

10. The wagon assembly according to claim 1 wherein said lid is further defined as having an upper surface and a lower surface, said upper surface including a plurality of recesses having water drains.

11. The wagon assembly according to claim 10 wherein said lower surface of said lid includes integrated structural ribs wherein said ribs provide lid rigidity with minimal plastic consumption.

12. The wagon assembly according to claim 8 wherein one of said recesses is constructed and arranged to receive a portion of a wheel whereby a wagon assembly of similar construction may be stacked with said recesses resisting wheel movement.

13. The wagon assembly according to claim 1 wherein said lid includes a removable pad to provide a comfortable seat.

14. A wagon assembly for carrying items and materials used in lawn and garden care comprising:
   a unitary body portion forming a compartment having a first storage structure from a generally rectangular bottom wall having an upper surface and a lower surface with sidewalls and endwalls extending upwardly therefrom;
   wheel structures rotatably connected to said unitary body portion of said first storage structure, said wheel structures spaced apart and juxtapositioned along a lower edge of said endwalls and being constructed and arranged to support said wagon assembly; a storage bin releasably secured to said lower surface of said bottom wall and positioned between said wheel structures and
   a pull strap secured to said storage structure, said pull strap operating as a handle for use in pulling of the wagon assembly.

15. The wagon assembly according to claim 14 wherein said storage bin is constructed and arranged to fit within said storage compartment.

16. The wagon assembly according to claim 15 wherein said storage compartment includes ledge tabs for positioning of storage bin within said compartment.

17. The wagon assembly according to claim 14 wherein said pull strap is constructed from a flexible strap wherein pulling on the strap permits movement of the wagon along an infinite range of horizontal angular positions.

18. The wagon assembly according to claim 17 wherein said pull strap is flexible and adjustable in length.

19. The wagon assembly according to claim 17 wherein said pull strap is removably secured to the wagon assembly.

20. The wagon assembly according to claim 14 wherein said wheel structures is further defined as a forward and aft wheel assembly, said forward and aft wheel assembly each having common axle extending across a width of said compartment with an wheels secured to each end of the axle.

21. The wagon assembly according to claim 20 wherein each said wheel is approximately 7 inches in diameter and each said sidewall is constructed and arranged to accommodate said wheel to permit.

22. The wagon assembly according to claim 14 including a lid structure constructed and arranged to enclose said compartment, said lid hingedly secured to said first compartment at an upper edge of one of said endwalls.

23. The wagon assembly according to claim 22 wherein said lid is further defined as having an upper surface and a lower surface, said upper surface including a plurality of recesses having water drains.

24. The wagon assembly according to claim 22 wherein said lower surface of said lid includes integrated structural ribs wherein said ribs provide lid rigidity with minimal plastic consumption.

25. The wagon assembly according to claim 23 wherein one of said recesses is constructed and arranged to receive a portion of a wheel whereby a wagon assembly of similar construction may be stacked with said recesses resisting wheel movement.

26. The wagon assembly according to claim 22 wherein said lid includes a removable pad to provide a comfortable seat.

* * * * *